United States Patent
Castanie et al.

(10) Patent No.: US 6,290,889 B1
(45) Date of Patent: *Sep. 18, 2001

(54) PROCESS FOR PRODUCING PRECISION HOLLOW ARTICLES MADE OF COMPOSITE MATERIAL

(75) Inventors: Jean-Louis Robert Marcel Castanie, Le Havre; Eric Celerier, Boussy St Antoine; Alain François Goncalves, Les Bouchoux, all of (FR)

(73) Assignee: Societe Nationale d'Etude et de Construction de Moteurs d'Aviation "Snecma", Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/035,299

(22) Filed: Mar. 5, 1998

(30) Foreign Application Priority Data

Mar. 6, 1997 (FR) .................................................. 97.02663

(51) Int. Cl.[7] .......................... B29C 33/40; B29C 43/10; B29C 43/20
(52) U.S. Cl. .......................... 264/219; 264/257; 264/258; 264/313; 264/317; 264/320; 264/102
(58) Field of Search .................................. 264/220, 257, 264/258, 313, 317, 319, 320, 231, 102, 219

(56) References Cited

U.S. PATENT DOCUMENTS

| 3,795,559 | | 3/1974 | Horn et al. . | |
|---|---|---|---|---|
| 3,892,831 | * | 7/1975 | Robin et al. | 264/103 |
| 4,167,430 | | 9/1979 | Arachi . | |
| 4,271,116 | | 6/1981 | Jones . | |
| 4,562,033 | * | 12/1985 | Johnson et al. | 264/510 |
| 4,681,724 | | 7/1987 | Faiz et al. . | |
| 4,683,099 | * | 7/1987 | Buxton et al. | 264/511 |
| 4,702,870 | * | 10/1987 | Setterholm et al. | 264/313 |
| 5,130,071 | * | 7/1992 | Iseler et al. | 264/102 |
| 5,131,834 | * | 7/1992 | Potter | 264/313 |
| 5,204,042 | * | 4/1993 | James et al. | 264/257 |
| 5,370,521 | * | 12/1994 | McDougall | 425/405.1 |
| 6,017,484 | * | 12/1985 | Hale | 264/510 |

FOREIGN PATENT DOCUMENTS

| 2 562 834 | | 10/1985 | (FR) . |
| 2 070 502 A | | 9/1981 | (GB) . |
| 2 173 144 A | | 10/1986 | (GB) . |

* cited by examiner

Primary Examiner—Jan H. Silbaugh
Assistant Examiner—Stefan Staicovici
(74) Attorney, Agent, or Firm—Oblon, Spivak, McClelland, Maier & Neustadt, P.C.

(57) ABSTRACT

A process for producing a hollow article made of a composite material of reinforcing fibers embedded in a matrix of hot-polymerized resin includes a step in which at least one core made of a silicone elastomer is draped with at least one layer of resin-impregnated reinforcing fibers. A resultant assembly is moulded to shape the internal and external surfaces of the hollow article by simultaneous inward and outward compression of at least one resin-impregnated fiber layer caused by movement of mould walls towards each other and by thermal expansion of at least one core.

6 Claims, 1 Drawing Sheet

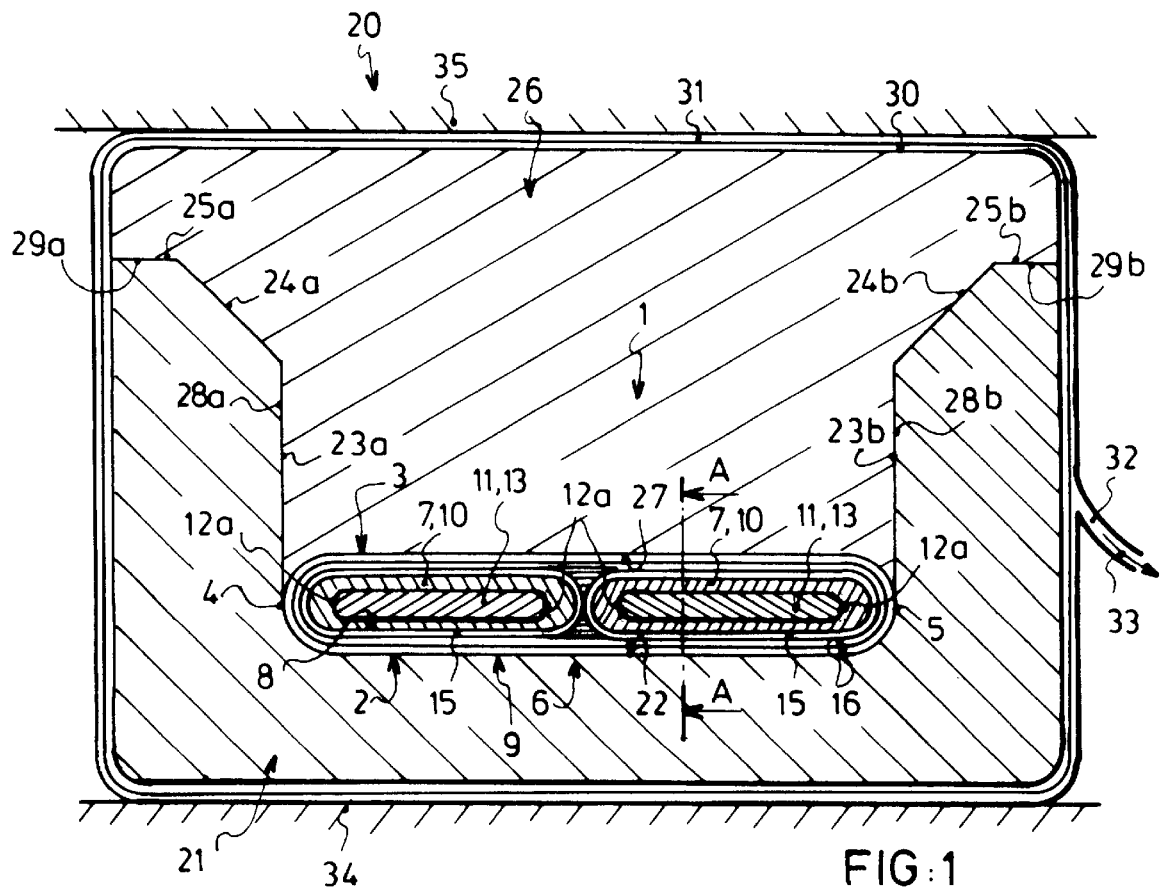
FIG:1
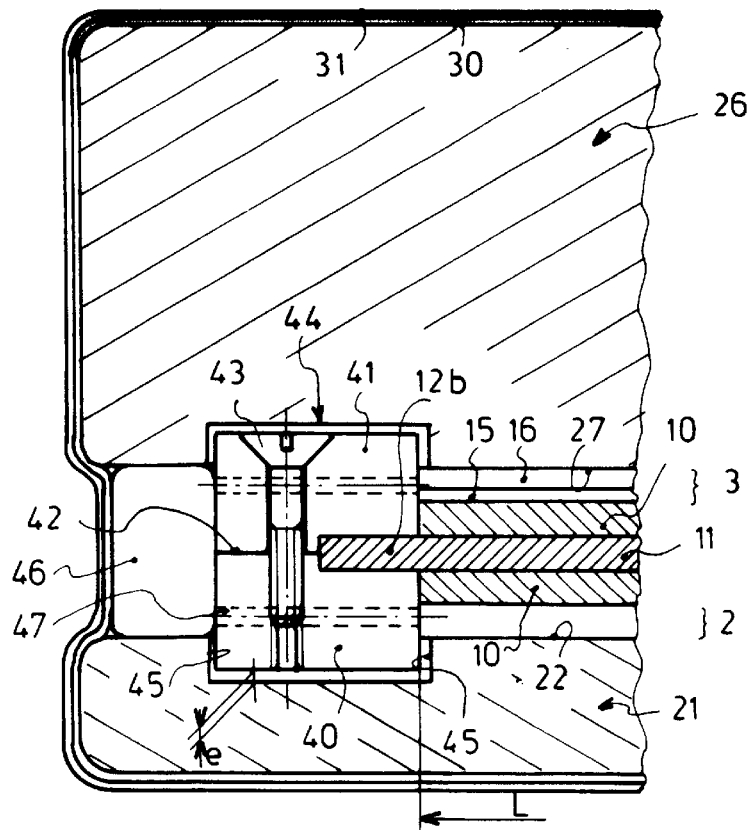
FIG:2

PROCESS FOR PRODUCING PRECISION HOLLOW ARTICLES MADE OF COMPOSITE MATERIAL

BACKGROUND OF THE INVENTION

1. Field of the Invention

The invention relates to a process for producing a hollow article made of a laminated composite material consisting of reinforcing fibres embedded in a polymerized organic resin matrix, and more particularly to such a process for producing an article having high strength, accuracy and temperature resistance characteristics.

Laminated composite materials comprising reinforcing fibres embedded in a matrix of polymerized resin are particularly useful in the aeronautical industry because of their excellent strength-to-weight ratio, and there is an increasing tendency to use such materials instead of metal alloys whenever possible, particularly in the case of thin-walled articles conventionally made by casting or metal fabrication techniques.

Endeavours are therefore being made to produce turbomachine parts, especially parts for aircraft turbojet engines, such as casing arms for low pressure compressors or hollow low pressure compressor blades having thin walls defining and extending around cavities which have an opening, i.e. which are not fully closed.

These articles must be integral in order to be free from weakening assembly zones. The articles must also be accurate and have a good surface texture so as to avoid the need for subsequent machining. Furthermore, the articles must be able to withstand high temperatures and their cost must be comparable with or below the equivalent metal articles.

2. Summary of the Prior Art

In the known resin transfer moulding process, known as RTM, reinforcing fibres are placed in a mould having the shape of the finished article, very liquid resin is injected under pressure into the mould and the resin is polymerized while maintaining the pressure. This process enables strong accurate articles to be obtained in a wide variety of shapes. However, the resins used have poor temperature resistance, which limits the use of the process to articles which will remain cool.

Resins which can withstand higher temperatures are not sufficiently fluid before polymerization. Consequently, to produce laminated hollow articles with such resins it is necessary to:

pre-impregnate layers of fabrics or fibres with the resin;

form a core which may or may not be destructible;

surround the core by an inflatable elastomeric bladder;

drape the pre-impregnated layers of fabric or fibres around the assembly of the core and the bladder;

place the assembly of the core, the bladder and the pre-impregnated layers of fabric or fibres in a mould corresponding to the external shape of the finished article;

inflate the bladder;

polymerize the resin;

deflate the bladder and remove the article from the mould;

withdraw or destroy the core; and withdraw the bladder.

In this process inflating the bladder makes it possible simultaneously to press the resin impregnated layers of fabric which form the composite material against the mould wall, and to compress and cause flow of the material so as to reduce porosities due to air bubbles trapped between the fibre layers, reduce emissions of gas from the resin during polymerization, and expel the excess resin and thereby increase fibre density. A compression corresponding to 20% of wall thickness is usually achieved.

Clearly, in such a process only the article surface in contact with the mould wall is accurate, whereas the surface in contact with the bladder is irregular and rough and follows the inevitable heterogeneities of the draping of the reinforcing fibres. It might be conceivable to compress the composite material on the core, but this solution would cause unacceptable creasing of the reinforcing fibres, causing a reduction in the strength of the article.

A first problem is therefore to produce, from pre-impregnated fibres or fabrics, hollow articles of a variety of shapes whose internal and external surfaces are accurate and smooth, without creasing the reinforcing fibres.

Polymerization of the resin is accompanied by an emission of gaseous components and a reduction in the volume of the resin, both of these phenomena tending to make the resulting composite material porous. This porosity can be reduced, but not eliminated, by the use of gas removal means and by compressing the composite material before the resin hardens in the course of its polymerization, the compression preferably causing a substantial deformation or flow of the composite material. Since the residual porosity reduces the strength of the final article, a second problem is to achieve a general reduction in the porosity of the composite material and, to this end in particular, to increase flow of the composite material during polymerization.

When the cavities open to the exterior through openings which are too small, as is often the case, the cores can be eliminated only by destruction of the material of which they are made. Materials are on the market which can be moulded to the required shape, then dissolved by water or a solvent after the article has been moulded. However, such cores are unsuitable in the present case since to produce accurate internal surfaces there would need to be an inward compression of the composite material on the core, with the disadvantages previously described. Consequently, a third problem is to remove the cores after the moulding of the article.

The use of composite materials is also hampered by the high production cost of the articles as compared with equivalent metal alloy articles. The high cost is due in particular to the many manipulations required in the production process. The complexity of the manufacturing process should therefore not be increased.

French Patent No. 2562834 discloses a process for moulding hollow articles made of a composite fibre and polymerized resin material using an external mould and a core made of a silicone elastomer, this latter material having a very high thermal expansion coefficient. In this process the core compresses the composite material against the mould walls as a result of the thermal expansion of the silicone elastomer during the hot polymerization cycle. The process provides an article having accurate internal and external surfaces but the composite material of the article has appreciable porosity. Therefore, and in order to produce homogeneous and smooth surfaces, French patent No. 2562834 also proposes, at lines 1 to 5 on page 8, to use a paint or gelcoat.

SUMMARY OF THE INVENTION

With the aim of overcoming the aforementioned problems, the invention provides a process for producing a hollow article made of a laminated composite material consisting of reinforcing fibres embedded in a matrix of hot-polymerized resin, said hollow article having external surfaces and internal surfaces defining at least one cavity, said process comprising the steps of:

a) providing a mould having a pair of walls for shaping said external surfaces of the article to be produced, a female part supporting one of said walls, a male part supporting the other of said walls and slidable in said female part to move said walls towards each other, and abutment surfaces on said female part and said male part which are engageable to define accurately the limit positions of said walls when moved towards each other;

b) making at least one core corresponding to the shape of said at least one cavity in the article to be produced, said at least one core being made from a thermally expansible silicone elastomer;

c) draping said at least one core with at least one layer of reinforcing fibres impregnated with hot polymerizable resin for forming said composite material;

d) placing the assembly consisting of said at least one core and said at least one layer of resin-impregnated fibres in said mould;

e) sliding said male part of said mould in said female part to move said walls towards each other and thereby compress the resin-impregnated fibre layers between said at least one core and said walls so as to shape said internal and external surfaces of the article simultaneously and to produce sufficient flow of the resin during polymerization;

f) raising the temperature of said assembly in said mould to polymerize said resin and to expand said at least one core and thereby stretch said reinforcing fibres during the compression shaping of said at least one layer of resin-impregnated fibres and the polymerization of said resin;

g) releasing the moulded article from said mould; and h) withdrawing said at least one core from said moulded article.

The external surfaces of the article formed by contact with the mould walls are accurate since the mould walls are rigid and are aprecisely positioned at the end of the their movement towards one another. Typically, an accuracy of 0.05 mm can be obtained. The surfaces are also very smooth, since the porosity of the material is very reduced allowing the mould walls to reproduce their own surface texture on the article.

Similar considerations apply to the internal surfaces of the article in contact with the core or cores. However, since the silicone elastomer of which the or each core is made is flexible the accuracy of the internal surfaces is less, but is still satisfactory since the composite material is pressed against the mould walls.

The core expansion produced by thermal expansion of the silicone elastomer of which the or each core is made is necessary to restretch the reinforcing fibres which would otherwise be creased by the inward compression produced by the movement of the mould walls towards one another.

This double action, i.e. the inward compression caused by the movement of the mould walls towards one another and the outward compression caused by expansion of the core or cores, promotes considerable flow of the composite material so that its porosity is reduced.

In the process in accordance with the invention the compression is no longer dependent only on the thermal expansion of the silicone elastomer core or cores as in French patent No. 2562834. Thermal expansion of the core or cores by itself will not have the effect of compressing the composite material against the mould walls, but will simply urge the walls apart because the male part is slidable in the female part. To produce the desired compression, an external force must be applied to the mould. For example by means of a press or by increasing the autoclave pressure, so as to urge the walls towards eachother.

Since the polymerization of the resin comprises a gas evolution phase and a hardening phase separated by a phase in which the resin is still liquid and therefore compressible, the compression shaping is preferably effected between the gas evolution phase and the hardening phase. The effect of this is to maintain a relatively large quantity of resin in the mould, with a resultant reduction in the porosity of the composite material end product, the resin remaining in the mould since it is no longer compressed at the start of the polymerization cycle and more particularly during the gas evolution phase. Also, since the compression is effected with a relatively large quantity of resin in the mould, stagnant gases in the mould are more readily expelled. These two factors combine to reduce the porosity of the final composite material.

If $T_1$ denotes the transition temperature of the resin from a pasty state to a solid state, it will be advantageous if the core or cores have expanded to the shape and dimensions of the required cavity at or just below this transition temperature $T_1$, with a possible correction for thermal expansion of the polymerized composite, which expansion is very low and is of the order of $1.10^{-6}/°C$. This enables the cavity to be given the required dimensions at the onset of hardening of the resin. The dimensions of the core when cold are then calculated by applying to the hot dimensions a coefficient corresponding to the thermal expansion of the silicone elastomer between the temperature $T_1$ and the ambient temperature, the elastomer itself usually being prepared by cold polymerization. Typically, an accuracy of 0.1 mm may be obtained for the internal surfaces of the article.

The hardness of the elastomer is not critical and one only has to choose an elastomer which is hard enough, for example a hardness of at least 30 Shore A, to ensure that possible deformations of the core remain compatible with the required accuracy of the article. If required the hardness of an elastomer can be increased by a charge of microballs, for example in the form of glass beads.

Preferably, the silicone elastomer chosen has a disintegration temperature $T_2$ below the hardening temperature $T_3$ at which the polymerization of the resin is completed, so that the elastomeric core will disintegrate during the moulding of the article. The core thus disintegrates during moulding as a result of the temperature to which the composite material is heated near the end of the polymerization cycle. The material of the core can then readily be withdrawn from the cavity after completion of the moulding process by a simple washing with water or even by scraping or brushing, so that the second problem is solved.

In a preferred embodiment, the silicone elastomer selected has a disintegration temperature $T_2$ between the temperature $T_1$ and $T_3$ in order to keep the core or cores in the solid state until the cavity or cavities have been formed to the required dimensions and in order that the core or cores disintegrate when the composite material itself has solidified, so that there is no risk of cracking the composite material.

Advantageously, the core or cores may be reinforced by rods of a stronger material, such as a metal alloy, in order to avoid the risk of deformation of the cores during the draping thereof or during the moulding of the composite material. Preferably these reinforcing rods extend beyond the core or cores and are supported in the mould in order to improve the accuracy with which the cores are positioned in the mould and thereby improve the accuracy of the positioning of the cavities in the article.

Further preferred features and advantages of the invention will become apparent from the following description of a preferred embodiment with reference to the accompanying drawings.

BRIEF DESCRIPTION OF THE DRAWINGS

FIG. 1 is a transverse cross-sectional view through the mould during moulding of an arm for a low pressure compressor casing for an aircraft engine by a preferred embodiment of the process in accordance with the invention, the thickness of the arm and its constituent parts being increased for the sake of clarity; and FIG. 2 is a longitudinal sectional view through part of the mould at one end of the casing arm, and taken on the line A—A in FIG. 1.

DESCRIPTION OF THE PREFERRED EMBODIMENT

The article 1 which is to be produced is an elongate thin compressor casing arm having two thin lateral parts or side walls 2, 3 which meet at a rear edge 4 and a front edge 5. At the centre of the arm 1 a rib 6 interconnects the side walls 2 and 3 in order to increase their stiffness and thus increase the stiffness of the arm 1. The side walls 2, 3 together with the rib 6 define two elongate cavities 7. The reference 8 denotes the internal surfaces of the arm 1 which bound the cavities 7, and the reference 9 denotes the external surfaces of the arm 1.

During moulding of the article 1, the cavities 7 are formed by cores 10 made of a silicone elastomer. Since the cores 10 are long and thin they are each stiffened by a metal rod 11 which extends through it lengthwise, each rod 11 having a flat rectangular cross-section with rounded edges 12a. Each silicone core 10 is produced by extrusion with a cavity 13 corresponding to the shape of the rod 11, followed by cutting to the required length identified by the reference L in FIG. 2. The rod 11 is then introduced into the cavity 13 of the core 10, an operation which, even if the core 10 is of reduced resilience, presents no difficulty.

The reinforced cores 10 are then each draped with one or more layers 15 of fibres which have been pre-impregnated with resin. The two draped cores are then placed side by side, following which they are together draped with one or more further layers 16 of resin-impregnated fibres so as to form a precursor for the required article.

The draped core assembly 10, 15, 16 is then placed in the female part 21 of a mould 20, the bottom wall 22 of the female part having a shape corresponding to the external surface of the side wall 2 of the required article 1. The bottom wall 22 lies adjacent two lateral walls 23a, 23b which are parallel to one another and are extended by respective flared walls 24a, 24b each adjacent a respective abutment surface 25a, 25b. The mould 20 also comprises a male part or plunger 26 whose end 27 forms a wall corresponding to the shape of the external surface of the side wall 3 of the article 1. The wall 27 lies adjacent two lateral walls 28a, 28b of a shape matching the walls 23a, 23b of the female part 21 so that the plunger 26 is slidable with a reduced clearance by way of its walls 28a, 28b between the walls 23a, 23b which guide the plunger. The lateral walls 28a, 28b are adjacent respective abutment surfaces 29a, 29b which contact the surfaces 25a, 25b of the female part 21 to limit the movement of the plunger into the female part. The mould assembly is surrounded by a felt layer 30 and by a flexible sealed envelope or bag 31 connected by a nozzle 32 to an evacuation source 33, and the whole assembly is disposed between the two plates 34, 35 of an oven press (not shown).

As shown in FIG. 2, the rod ends 12b extend beyond each end of each core 10 and are engaged between two jaws 40, 41 which contact one another at a separation surface 42 and are clamped together by screws 43. The jaws 40, 41 are positioned in a cavity 44 of the mould 20 which opens to the exterior and which has a shape matching the shape of the jaws 40, 41 with a clearance e of approximately 0.2 mm. The inside of the cavity 44 has two shoulders 45 for positioning the jaws 40, 41 longitudinally, and the opening part of the cavity 44 is filled by a felt pad 46 The clearance e allows the mass of composite material 15, 16 to communicate with the felt 46 so that the excess resin can be removed while an adequate internal pressure is maintained. The other end (not shown) of the assembly is symmetrical with the end shown in FIG. 2. The distance between the pair of jaws 40, 41 and the corresponding pair of jaws at the other end is equal to the length L of the cores 10.

In this embodiment the cores 10 are made of a silicone elastomer having a Shore hardness of 70A, a disintegration temperature T2 of 290° C. and a thermal expansion coefficient of $400.10^{-6}$°C. The article 1 is made from carbon fibres which have a thermal expansion coefficient of substantially zero up to 300° C. and which are formed as fabrics and pre-impregnated with a hot polymerizable resin sold by a company called FIBERITE-USA under the trade name "PMR 15". This resin has a temperature T1 of transition from a pasty state to a solid state of 280° C., and a resin hardening temperature T3 of 320° C.

The process of assembling the components for producing the article 1 comprises the following main operations:

a) formation of the cores 10 by extrusion and cutting to the length L;

b) introduction of a metal rod 11 into each core 10 so that the rod ends 12b project beyond each end of the core 10;

c) draping at least one layer 15 of resin-impregnated fibres around each of the cores 10;

d) placement of the assemblies comprising the rods 11, cores 10 and resin-impregnated layers 15 edge to edge and clamping one end 12b of the rods 11 between a first pair of the jaws 40, 41 by means of the screws 43;

e) clamping the other end 12b of the rods between a second pair of the jaws 40, 41;

f) draping the resulting assembly between the two pairs of jaws with at least one further layer 16 of resin-impregnated fibres;

g) placing the entire assembly in the female part 21 of the open mould 20 and closing the mould by inserting the male part 26 into the female part; and h) placing the felt pads 46 at the entry of the mould cavities 44, successively placing around the mould 20 the felt layer 30 and the sealed bag 31 with the nozzle 32, and placing the enclosed mould between the plates 34, 35 of the oven press (not shown).

A thermal resin-polymerization cycle is then carried out, thus locating the mould walls 22 and 27 accurately relative to one another and to the cores 10 and ensuring the accuracy and quality of the external surfaces of the two sides 2 and 3 of the article 1 and the accuracy of the dimensions and positioning of the cavities 7 relative to the sides 2 and 3. The sliding is caused by the combined effect of the pressure exerted by the oven press plates 34, 35 and of atmospheric pressure acting on the bag 31 which is evacuated to a negative pressure.

The pressure causes the excess resin to be extruded into the cavities 44 around the jaws 40, 41 via the clearance e left between the jaws 40, 41 and the cavity walls, the resin accumulating in the felt pads 46. If necessary, additional cavities (not shown) can be provided in the mould to receive the excess resin.

During polymerisation the liquid resin evolves gases which it is essential to remove if porosities in the composite material are to be avoided. This removal is facilitated by the negative pressure produced in the bag 31 by way of the nozzle 32, the negative pressure being communicated to the resin through the felt 30 between the bag 31 and the mould 20, between the walls 23a, 23b and 28a, 28b, and through the felt pads 46 and the clearance e.

Advantageously, the jaws 40, 41 also may be pierced by a number of conical holes 47 through which the composite material can communicate with the felt pads 46 to facilitate the removal of excess resin and gases. The conicity of the holes 47 facilitates removal of the hardened resin after completion of the moulding.

When the temperature T of the composite material has reached the transition temperature T1 of 280° C., the silicone elastomer cores 10 have expanded to reach the required dimensions of the cavities 7, thus ensuring accuracy. As the temperature increases above T1 the solidified composite material is held in position by the mould walls 22, 27 and opposes further expansion of the cores 10, the material of which starts to become cross-linked. When the temperature T reaches 290° C., corresponding to the disintegration temperature of the elastomer, the cores 10 start to break up and cease to apply pressure to the composite material. Polymerisation then continues up to the resin hardening temperature T3 of 320° C.

The moulded assembly is then removed hot from the mould to ensure that the mould 20, as it contracts with the reducing temperature, does not crush the composite material which is now solidified and hardened. The excess amounts of resin are then broken and removed, the jaws 40, 41 are removed, the rods 11 are withdrawn, and the disintegrated material of the cores 10 is removed mechanically from the cavities 7 by any non-abrasive mechanical means such as scraping, blowing or washing.

With such a process a turbomachine casing arm having a length L of 400 mm, a width of 12 mm, and side walls 2, 3 having a thickness of 2 mm can be produced directly by moulding, with a geometric accuracy of 0.05 mm in the case of the surfaces formed by the mould walls and a geometric accuracy of 0.1 mm in the case of the surfaces formed by the cores. The external and internal surfaces are completely smooth, and subsequent machining operations are limited to deburring the hardened resin along the lines of removal of the excess resin and to drilling fixing holes in the ends of the article 1. The porosity of the composite material is reduced to 2%.

Because of the resin used the article 1 can be used at a working temperature of 280° C. and can temporarily withstand a temperature of up to 325° C.

The invention is not limited to the embodiment which has just been described, but covers all such variants which could be made to it in respect of the required article and the means to be used and which fall within the scope of the claims appearing hereinafter.

Of course, the number and shape of the cores can vary according to the required article, and the holes through which the cavities communicate with the exterior can be of reduced size relatively to the cavities shown. It is unnecessary to use the stiffening rods 11 when the cores 10 are short and are therefore unlikely to bend. In such a case a harder elastomer may be used to prevent possible deformations of the cores.

If the article 1 is formed with just a single cavity it is possible to use just a single resin-impregnated fibre layer. In the case of flat articles the inward compression is exerted on the article flanks 2, 3.

In the embodiment described the walls of the cavities are defined by parallel geometric lines, so that it has been possible to produce the cores 10 directly by extrusion and cutting them to the length L. In the case of cavities of irregular shape, for example a keg shape, the core 10 is made by moulding. The metal rods 11 can be omitted in the case of squat cores 10 and the cores 10 can be stiffened by the choice of an elastomer having a higher Shore A hardness or by inclusion of microballs in the elastomer.

The holes through which the cavities communicate with the exterior can be of reduced dimensions since the cores break up during the thermal polymerisation cycle, thus simplifying removal of the core material.

Combined use of the negative pressure bag 31 and the oven press make it possible to reach the pressure of 8 bars required for compression of the resin used in this embodiment. An ordinary press and a mould heated, for example, by electrical resistance elements can also be used. Should the resin require a compression of less than 1 bar, the compression can be obtained without using a press and relying solely on the action of atmospheric pressure.

We claim:

1. A process for producing a hollow article made of a laminated composite material of reinforcing fibers embedded in a matrix of hot-polymerized resin, said hollow article having external surfaces and internal surfaces defining at least one cavity, said process comprising the steps of:

a) providing a rigid mould having a pair of walls for shaping said external surfaces of the hollow article to be produced, a female part supporting one of said walls, a male part supporting a second one of said walls and being slidable in said female part to move said walls towards each other, and abutment surfaces on said female part and said male part which are engageable to define accurately limit positions of said walls;

b) making at least one core corresponding to the shape of said at least one cavity in the hollow article to be produced, said at least one core being made from a thermally expansible silicone elastomer;

c) draping said at least one core withath at least one layer of reinforcing fibers impregnated with hot polymerizable resin for forming said laminated composite material;

d) placing an assembly of said at least one core and at least one layer of resin-impregnated reinforcing fibers in said mould;

e) sliding said male part of said mould in said female part to move said walls towards each others;

f) raising the temperature of the assembly placed in said mould to polymerize said resing and to expand said at least one core wherein polymerization of said resin includes a gas evolution phase and a hardening phase separated by a liquid phase;

g) releasing the hollow article from said mould; and
h) withdrawing said at least one core from said hollow article;

wherein a step of compression is performed between said gas evolution phase and said hardening phase in order to retain a relatively large quantity of said resin within said mould;

wherein said polymerization of said resin involves a transition of the resin from a pasty state to a solid state at a transition temperature and said at least one core has expanded to required dimensions of said at least one cavity of the hollow article at said transition temperature to ensure that said at least one cavity has the required dimensions at a start of the hardening phase of said resin;

wherein the silicone elastomer of said at least one core has a desintegration temperature below a hardening temperature at which said polymerization of said resin is completed, whereby said at least one core is desintegrated during moulding of the hollow article; and wherein said desintegration temperature of said silicone elastomer is between said transition temperature and said hardening temperature whereby said at least one core remains in the solid state until the required dimensions of said at least one cavity of the hollow article has been reached after the laminated composite material has solified;

whereby the porosity of the hollow article made of the laminated composite material is reduced to 2.

2. A process according to claim 1, wherein said at least one core is provided with at least one reinforcing rod of a material stronger than said silicone elastomer to prevent deformation of said at least one core during one of the draping of said at least one core and moulding of said laminated composite material.

3. A process according to claim 2, wherein said at least one reinforcing rod extends beyond said at least one core and is supported in said mould to ensure accurate positioning of said at least one core in said mould.

4. A process according to claim 1, wherein at least two cores are made, each of said at least two cores is draped separately with at least one layer of said resin-impregnated reinforcing fibers, and the draped cores are joined together and then jointly draped with at least one further layer of said resin-impregnated reinforcing fibers.

5. A process according to claim 1, wherein the assembly placed in the mould is compressed to shape internal and external surfaces of the hollow article by simultaneous inward compression and outward compression of at least one resin-impregnated fiber layer caused by movement of the walls towards each and by thermal expansion of at least one core, respectively.

6. A process according to claim 1, wherein, during polymerization of the resin, at least one layer of reinforcing fibers, pre-impregnated with the resin, simultaneously undergoes outward compression by thermal dilation of at least one core and inward compression by bringing the walls closer together until the abutment surfaces are placed in contact with each other and act as stops.

* * * * *

UNITED STATES PATENT AND TRADEMARK OFFICE
CERTIFICATE OF CORRECTION

PATENT NO.    : 6,290,889 B1
DATED         : September 18, 2001
INVENTOR(S)   : Jean-Louis R. M. Castanie et al.

It is certified that error appears in the above-identified patent and that said Letters Patent is hereby corrected as shown below:

Column 3,
Line 43, change "aprecisely" to -- precisely --.

Column 4,
Line 8, change "eachother" to -- each other --.

Column 6,
Line 15, change "e" to -- $\underline{e}$ --; and
Line 18, after "46", insert a period; change "e" to -- $\underline{e}$ --.

Column 7,
Line 9, change "e" to -- $\underline{e}$ --; and
Line 21, change "e" to -- $\underline{e}$ --.

Column 8,
Line 54, change "withath" to -- with --;
Line 62, change "others" to -- other --; and
Line 64, change "resing" to -- resin --.

Column 9,
Line 30, change "2" to -- 2% --.

Signed and Sealed this

Thirtieth Day of April, 2002

Attest:

*Attesting Officer*

JAMES E. ROGAN
*Director of the United States Patent and Trademark Office*